United States Patent
Minami (10) Patent No.: US 11,575,151 B2
(45) Date of Patent: Feb. 7, 2023

(54) SULFIDE SOLID ELECTROLYTE, PRECURSOR OF SULFIDE SOLID ELECTROLYTE, ALL SOLID STATE BATTERY AND METHOD FOR PRODUCING SULFIDE SOLID ELECTROLYTE

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 443 days.

(21) Appl. No.: 16/829,018

(22) Filed: Mar. 25, 2020

(65) Prior Publication Data
US 2020/0313234 A1    Oct. 1, 2020

(30) Foreign Application Priority Data

Mar. 28, 2019  (JP) .............................. JP2019-063867
Mar. 10, 2020  (JP) .............................. JP2020-041049

(51) Int. Cl.
*H01M 10/0562* (2010.01)
*H01M 10/0525* (2010.01)

(52) U.S. Cl.
CPC .............. *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2017/0222257 A1 | 8/2017 | Miyashita et al. | |
| 2018/0069262 A1 | 3/2018 | Utsuno et al. | |
| 2019/0319305 A1* | 10/2019 | Utsuno ............... | H01M 10/052 |

FOREIGN PATENT DOCUMENTS

| | | |
|---|---|---|
| JP | 2016-024874 A | 2/2016 |
| JP | 2018-045997 A | 3/2018 |
| WO | 2018092366 A1 | 5/2018 |

OTHER PUBLICATIONS

Deiseroth H-J et al., "Li6PS5X: A Class of Crystalline Li-Rich Solids With an Unusually High Li+ Mobility" Angewandte vol. 47, No. 4, Jan. 11, 2008, pp. 755-758.

* cited by examiner

*Primary Examiner* — Eli S Mekhlin
(74) *Attorney, Agent, or Firm* — Dickinson Wright, PLLC (57) ABSTRACT

A main object of the present disclosure is to provide a sulfide solid electrolyte with high ion conductivity. In the present disclosure, the above object is achieved by providing a sulfide solid electrolyte comprising: a Li element, an M element (M is at least one kind of P, Ge, Si and Sn), and a S element, and the sulfide solid electrolyte has an argyrodite type crystal phase, in $^{31}$P-MAS-NMR, the sulfide solid electrolyte has peak A at 82.1 ppm±0.5 ppm and peak B at 86.1 ppm±0.5 ppm, and when an area ratio of the peak A is regarded as $S_A$, and an area ratio of the peak B is regarded as $S_B$, a proportion of the $S_B$ to the $S_A$, that is $S_B/S_A$, is 0.23 or less.

11 Claims, 8 Drawing Sheets

SULFIDE SOLID ELECTROLYTE, PRECURSOR OF SULFIDE SOLID ELECTROLYTE, ALL SOLID STATE BATTERY AND METHOD FOR PRODUCING SULFIDE SOLID ELECTROLYTE

TECHNICAL FIELD

The present disclosure relates to a sulfide solid electrolyte with high ion conductivity.

BACKGROUND ART

An all solid state battery is a battery including a solid electrolyte layer between a cathode layer and an anode layer, and an advantage thereof is that the simplification of a safety device may be more easily achieved compared to a liquid based battery including a liquid electrolyte containing a flammable organic solvent. As a solid electrolyte used for the all solid state battery, a sulfide solid electrolyte is known.

Patent Literature 1 discloses a sulfide solid electrolyte comprising an X element that is one kind or more elements selected from lithium, phosphorous, sulfur and halogen, having an argyrodite type crystal structure, and having a specific composition. Also, Patent Literature 2 discloses a sulfide based solid electrolyte for a lithium ion battery having a cubical argyrodite type crystal structure and having a specific composition.

CITATION LIST

Patent Literatures

Patent Literature 1: Japanese Patent Application Laid-Open (JP-A) No. 2018-045997
Patent Literature 2: JP-A No. 2016-024874

SUMMARY OF DISCLOSURE

Technical Problem

In order to improve the battery properties, a sulfide solid electrolyte with high ion conductivity has been demanded. The present disclosure has been made in view of the above circumstances, and a main object of the present disclosure is to provide a sulfide solid electrolyte with high ion conductivity.

Solution to Problem

In order to achieve the above object, the present disclosure provides a sulfide solid electrolyte comprising: a Li element, an M element (M is at least one kind of P, Ge, Si and Sn), and a S element, and the sulfide solid electrolyte has an argyrodite type crystal phase, in $^{31}$P-MAS-NMR, the sulfide solid electrolyte has peak A at 82.1 ppm±0.5 ppm and peak B at 86.1 ppm±0.5 ppm, and when an area ratio of the peak A is regarded as $S_A$, and an area ratio of the peak B is regarded as $S_B$, a proportion of the $S_B$ to the $S_A$, that is $S_B/S_A$, is 0.23 or less.

According to the present disclosure, since $S_B/S_A$ is low, a sulfide solid electrolyte with high ion conductivity may be obtained.

In the disclosure, the sulfide solid electrolyte may further have peak C at 89.1 ppm±0.5 ppm, and when an area ratio of the peak C is regarded as $S_C$, a proportion of a total of the $S_B$ and the $S_C$ to the $S_A$, that is $(S_B+S_C)/S_A$, may be 0.27 or less.

In the disclosure, the sulfide solid electrolyte may further have peak D at 84.1 ppm±0.5 ppm.

In the disclosure, the M may include at least P.

In the disclosure, the sulfide solid electrolyte may further comprise an X element (X is a halogen).

In the disclosure, the X may include at least Cl.

In the disclosure, the sulfide solid electrolyte may have a composition represented by $Li_{7-y}PS_{6-y}X_y$ (y satisfies 0<y≤2)

The present disclosure also provides a precursor of the above described sulfide solid electrolyte wherein a $Li_2S$ residual ratio is 7.7% or more and 54.7% or less.

According to the present disclosure, since the $Li_2S$ residual ratio is in the specific range, a precursor that enables to obtain a sulfide solid electrolyte with high ion conductivity may be obtained.

The present disclosure also provides an all solid state battery comprising a cathode layer, an anode layer, and a solid electrolyte layer formed between the cathode layer and the anode layer, and at least one of the cathode layer, the anode layer and the solid electrolyte layer includes the above described sulfide solid electrolyte.

According to the present disclosure, an all solid state battery with high output property may be obtained by using the above described sulfide solid electrolyte.

The present disclosure also provides a method for producing the above described sulfide solid electrolyte, the method characterized by comprising steps of: a mixing step of obtaining a precursor with a $Li_2S$ residual ratio of 7.7% or more and 54.7% or less, by mixing a raw material composition including at least $Li_2S$, and a burning step of burning the precursor.

According to the present disclosure, a sulfide solid electrolyte with high ion conductivity may be obtained by using the precursor wherein the $Li_2S$ residual ratio is in the specific range.

Advantageous Effects of Disclosure

The sulfide solid electrolyte in the present disclosure exhibits effects such that the ion conductivity is high.

DESCRIPTION OF EMBODIMENTS

The sulfide solid electrolyte, the precursor of the sulfide solid electrolyte, the all solid state battery and the method for producing the sulfide solid electrolyte in the present disclosure will be hereinafter described in detail.

A. Sulfide Solid Electrolyte

The sulfide solid electrolyte in the present disclosure comprises a Li element, an M element (M is at least one kind of P, Ge, Si and Sn), and a S element. Further, the sulfide solid electrolyte has an argyrodite type crystal phase. Also, in $^{31}$P-MAS-NMR, the sulfide solid electrolyte has peak A at 82.1 ppm±0.5 ppm and peak B at 86.1 ppm±0.5 ppm, and when an area ratio of the peak A is regarded as $S_A$, and an area ratio of the peak B is regarded as $S_B$, a proportion of the $S_B$ to the $S_A$, that is $S_B/S_A$, is the specific value or less.

According to the present disclosure, since $S_B/S_A$ is low, a sulfide solid electrolyte with high ion conductivity may be obtained. As described later, peak A is a peak deriving from the argyrodite type crystal phase, and peak B is a peak deriving from an amorphous phase related to the argyrodite type crystal phase.

Here, as a method for synthesizing a sulfide solid electrolyte having the argyrodite type crystal phase, a method wherein a sulfide glass is produced by milling a raw material composition, and then, the sulfide glass is burned, is conventionally know.

From the detailed investigation by the present inventor regarding the relationship between the amorphous property of a sulfide glass and the ion conductivity of a sulfide solid electrolyte obtained by burning the sulfide glass, it was found out that, when the amorphous property of the sulfide glass is too high, the amorphous phase tends to remain in the obtained sulfide solid electrolyte so that the ion conductivity is not sufficiently improved. Similarly, it was found out that, when the amorphous property of the sulfide glass is too low, uniform solid-phase reaction hardly occurs during burning so that an argyrodite type crystal phase with high ion conductivity is hardly deposited. So, by producing a precursor by moderately amorphizing the raw material composition and burning the precursor, a sulfide solid electrolyte with little remaining amorphous phase could be obtained. As described above, in the present disclosure, since $S_B/S_A$ is low, a sulfide solid electrolyte with high ion conductivity may be obtained.

Patent Literature 1, for example, discloses in Example thereof that mechanical milling was carried out under conditions of 370 rpm for 25 hours. As described in the later described Comparative Example 4, it was suggested that $S_B/S_A$ was high since $Li_2S$ residual ratio was low and the amorphization was progressed. Also, Patent Literature 2, for example, discloses in Example thereof that a crushing and mixing was carried out for 15 hours with a ball mill; however, since the rotation speed of the ball mill is not known, it is difficult to compare directly. Also, although Patent Literature 2 discloses in [0027] "therefore, pulverization and mixing to the extent that crystallinity of the raw material powders can be maintained is desirable", it is difficult to compare quantitatively, since it is not clear whether "crystallinity of the raw material powders" indicates the crystallinity of the all raw material powders, or the crystallinity of a part of the raw material powder. In the first place, an object of Patent Literature 2 is to prevent sulfur defects at the time of calcination, and the object is different from that of the present disclosure.

The sulfide solid electrolyte in the present disclosure comprises a Li element, an M element (M is at least one kind of P, Ge, Si and Sn), and a S element. The sulfide solid electrolyte may further comprise an X element (X is a halogen).

The sulfide solid electrolyte has an argyrodite type crystal phase. The argyrodite type crystal phase in the sulfide solid electrolyte may be confirmed by an X-ray diffraction (XRD) measurement. The sulfide solid electrolyte preferably has a peak at 2θ=15.6°±0.5°, 18.1°±0.5°, 25.7°±0.5°, 30.2°±0.5°, and 31.6°±0.5° in an X-ray diffraction (XRD) measurement using a CuKα ray. These peaks are typical peaks of the argyrodite type crystal phase. The sulfide solid electrolyte preferably has the argyrodite type crystal phase as a main phase.

The sulfide solid electrolyte has peak A at 82.1 ppm±0.5 ppm and peak B at 86.1 ppm±0.5 ppm in $^{31}$P-MAS-NMR. Peak A is a peak deriving from the argyrodite type crystal phase, and peak B is a peak deriving from an amorphous phase related to the argyrodite type crystal phase. Also, when an area ratio of the peak A is regarded as $S_A$, and an area ratio of the peak B is regarded as $S_B$, a proportion of the $S_B$ to the $S_A$, that is $S_B/S_A$, is preferably low. The reason is because the ion conductivity of the crystal phase is higher than the amorphous phase. $S_B/S_A$ is usually 0.23 or less. Meanwhile, $S_B/S_A$ may be 0, and may be more than 0. In the latter case, $S_B/S_A$ may be 0.16 or more.

$S_A$ is preferably high. $S_A$ is, for example, 50% or more, may be 51.8% or more, and may be 55.6% or more. Meanwhile, $S_A$ is, for example, 65% or less, and may be 60.1% or less. $S_B$ is preferably low. $S_B$ is, for example, 15% or less, and may be 13.2% or less. Meanwhile, $S_B$ may be 0%, and may be more than 0%. In the latter case, $S_B$ may be 9.6% or more.

The sulfide solid electrolyte may further have peak C at 89.1 ppm±0.5 ppm, and may not have peak C. When the proportion of the X element included in the sulfide solid electrolyte is high, for example, the peak C tends to appear, although the improvement of the ion conductivity may be expected. When an area ratio of the peak C is regarded as $S_C$, a proportion of a total of the $S_B$ and the $S_C$ to the $S_A$, that is $(S_B+S_C)/S_A$, is preferably low. $(S_B+S_C)/S_A$ is, for example, 0.27 or less, and may be 0.24 or less. Meanwhile, $(S_B+S_C)/S_A$ is, for example, 0.05 or more, and may be 0.18 or more. The $S_C$ is preferably low. The $S_C$ is, for example, 2.1% or less, and may be 1.1% or less. Meanwhile, $S_C$ may be 0%, and may be more than 0%. In the latter case, $S_C$ may be 0.7% or more.

The sulfide solid electrolyte may further have peak D at 84.1 ppm±0.5 ppm, and may not have peak D. When the area ratio of the peak D is regarded as $S_D$, the $S_D$ is, for example, 1% or more, and may be 10% or more. Meanwhile, $S_D$ is, for example, 35% or less.

The sulfide solid electrolyte in the present disclosure comprises a Li element, an M element (M is at least one kind of P, Ge, Si and Sn), and a S element. The M element may be one kind, and may be two kinds or more. The sulfide solid electrolyte preferably comprises at least P element as the M element. Also, the sulfide solid electrolyte may further comprise an X element (X is a halogen), and may not comprise the X element. Examples of the X element may include a F element, a Cl element, a Br element and an I element. The X element may be one kind, and may be two kinds or more. The sulfide solid electrolyte preferably comprises at least a Cl element as the X element. When the sulfide solid electrolyte comprises two kinds or more of the X element, the proportion of Cl element to all the X elements is, for example, 50 mol % or more, may be 70 mol % or more, and may be 90 mol or more.

Also, peak A and peak B in $^{31}$P-MAS-NMR are caused by the argyrodite type crystal phase. Therefore, the composition of the sulfide solid electrolyte is not particularly limited as long as the composition is able to give such an argyrodite type crystal phase. Examples of the composition of the sulfide solid electrolyte may include $Li_{7-y}PS_{6-y}X_y$ (y satisfies $0 \leq y \leq 2$). The y may be 0, and may be more than 0. In the latter case, the y may be 0.5 or more, may be 1.0 or more, may be 1.2 or more, and may be 1.4 or more. As the y increases, the ion conductivity of the sulfide solid electrolyte also increases. Meanwhile the y is usually 2 or less, may be 1.8 or less, may be 1.7 or less, and may be 1.6 or less. When the y is too high, a crystal phase (different phase) with low ion conductivity is likely to occur.

The ion conductivity of the sulfide solid electrolyte is preferably high. The ion conductivity at 25° C. is, for example, 7 mS/cm or more, may be 8 mS/cm or more, and may be 9 mS/cm or more.

Examples of the shape of the sulfide solid electrolyte may include a granular shape. Also, the average particle size ($D_{50}$) of the sulfide solid electrolyte is, for example, 0.1 μm or more and 50 μm or less. The average particle size ($D_{50}$) may be determined from the result of a particle size distribution measurement by a laser diffraction scattering method. A use application of the sulfide solid electrolyte is not particularly limited, and is preferably used for, for example, an all solid state battery.

B. Precursor of Sulfide Solid Electrolyte

The precursor of the sulfide solid electrolyte in the present disclosure is a precursor of the above described sulfide solid electrolyte, and the $Li_2S$ residual ratio thereof is in a specific range.

According to the present disclosure, since the $Li_2S$ residual ratio is in the specific range, a precursor that enables to obtain a sulfide solid electrolyte with high ion conductivity may be obtained.

The constituent element, composition, and other matters of the precursor may be in the same contents as those described in "A. Sulfide solid electrolyte" above; thus, the descriptions herein are omitted.

The $Li_2S$ residual ratio is usually 7.7% or more, may be 23.3% or more. When the $Li_2S$ residual ratio is too low, an amorphous phase is likely to be remained in the sulfide solid electrolyte obtained by burning the precursor. As the result, there is a possibility that the ion conductivity is not sufficiently improved. Meanwhile, the $Li_2S$ residual ratio of the precursor is usually 54.7% or less, and may be 34.2% or less. When the $Li_2S$ residual ratio is too high, uniform solid-phase reaction hardly occurs during burning so that an argyrodite type crystal phase with high ion conductivity is hardly deposited. As the result, there is a possibility that the ion conductivity is not sufficiently improved. A method for calculating the $Li_2S$ residual ratio will be described in Examples described later.

When an X-ray diffraction (XRD) measurement using a CuKα ray is carried out, the precursor usually has a peak of $Li_2S$. Also, the precursor may or may not have a peak of LiX (X is a halogen). Examples of LiX may include LiF, LiCl, LiBr and LiI. Also, the precursor may or may not have a peak of $P_2S_5$. Incidentally, the precursor does not usually have the argyrodite type crystal phase; however, the argyrodite type crystal phase occurs by burning.

The precursor of the sulfide solid electrolyte is preferably used for obtaining the sulfide solid electrolyte described in "A. Sulfide solid electrolyte" above.

C. All Solid State Battery

Figure 1:
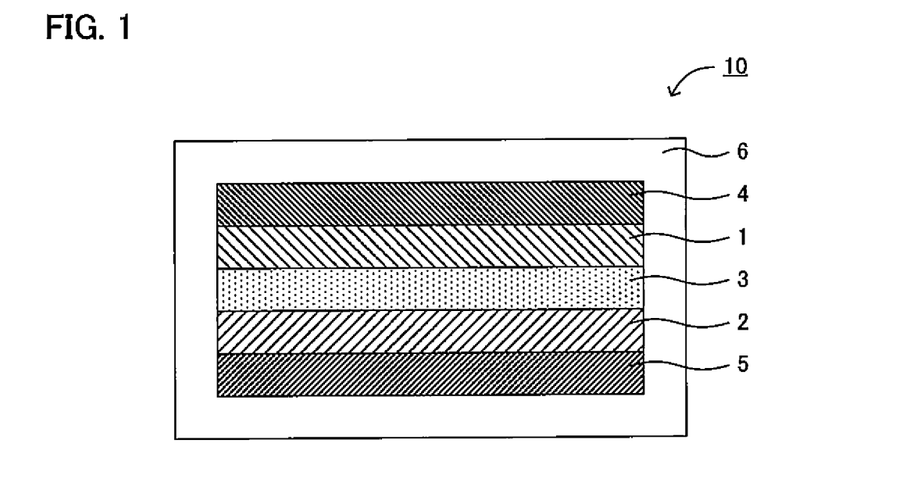
FIG. 1 is a schematic cross-sectional view showing an example of the all solid state battery in the present disclosure.

FIG. 1 is a schematic cross-sectional view showing an example of the all solid state battery in the present disclosure. All solid state battery 10 shown in FIG. 1 comprises cathode layer 1 including a cathode active material, anode layer 2 including an anode active material, solid electrolyte layer 3 formed between cathode layer 1 and anode layer 2, cathode current collector 4 for collecting currents of cathode layer 1, anode current collector 5 for collecting currents of anode layer 2, and battery case 6 that houses these members. Further, at least one of cathode layer 1, anode layer 2 and solid electrolyte layer 3 includes the sulfide solid electrolyte described in "A. Sulfide solid electrolyte" above.

According to the present disclosure, an all solid state battery with high output property may be obtained by using the above described sulfide solid electrolyte.

1. Cathode Layer

The cathode layer in the present disclosure is a layer including at least a cathode active material. The cathode layer may include at least one of a solid electrolyte, a conductive material and a binder, in addition to the cathode active material.

Examples of the cathode active material may include an oxide active material. Specific examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, and $Li(Ni_{0.5}Mn_{1.5})O_4$; and olivine type active materials such as $LiFePO_4$, $LiMnPO_4$, $LiNiPO_4$, and $LiCuPO_4$.

The surface of the cathode active material may be coated with a coating layer. The reason therefor is to inhibit the reaction of the cathode active material with the sulfide solid electrolyte. Examples of the material for the coating layer may include Li ion conductive oxides such as $LiNbO_3$, $Li_3PO_4$, and LiPON. The average thickness of the coating layer is, for example, 1 nm or more and 20 μm or less, and may be 1 nm or more and 10 nm or less.

The cathode layer in the present disclosure preferably includes the above described sulfide solid electrolyte. Also, examples of the conductive material may include a carbon material. Examples of the carbon material may include particulate carbon materials such as acetylene black (AB) and Ketjen black (KB); and fibrous carbon materials such as carbon fiber, carbon nanotube (CNT), and carbon nanofiber (CNF). Examples of the binder may include fluorine-based binders such as polyvinylidene fluoride (PVDF). The thickness of the cathode layer is, for example, 0.1 μm or more and 1000 μm or less.

2. Solid Electrolyte Layer

The solid electrolyte layer in the present disclosure is a layer including at least a solid electrolyte. Also, the solid electrolyte layer may include a binder, in addition to the solid electrolyte. The solid electrolyte and the binder are similar to those described above. The solid electrolyte layer in the present disclosure preferably includes the above described sulfide solid electrolyte. The thickness of the solid electrolyte layer is, for example, 0.1 μm or more and 1000 μm or less.

3. Anode Layer

The anode layer in the present disclosure is a layer including at least an anode active material. Also, the anode layer may include at least one of a solid electrolyte, a conductive material and a binder, in addition to the anode active material.

Examples of the anode active material may include a metal active material and a carbon active material. Examples of the metal active material may include In, Al, Si, and Sn. Meanwhile, examples of the carbon active material may include mesocarbon microbead (MCMB), highly oriented pyrolytic graphite (HOPG), hard carbon, and soft carbon.

The solid electrolyte, the conductive material and the binder are similar to those described above. The anode layer in the present disclosure preferably includes the above described sulfide solid electrolyte. The thickness of the anode layer is, for example, 0.1 µm or more and 1000 µm or less.

4. Other Constitutions

The all solid state battery in the present disclosure usually comprises a cathode current collector for collecting currents of the cathode active material and an anode current collector for collecting currents of the anode active material. Examples of the materials for the cathode current collector may include SUS, aluminum, nickel, iron, titanium, and carbon. Meanwhile, examples of the materials for the anode current collector may include SUS, copper, nickel, and carbon. Also, for a battery case, a common battery case such as a battery case made from SUS may be used.

5. All Solid State Battery

The all solid state battery in the present disclosure is preferably an all solid state lithium ion battery. Also, the all solid state battery may be a primary battery, and may be a secondary battery. Among the above, the secondary battery is preferable, so as to be repeatedly charged and discharged, and is useful as, for example, a car-mounted battery. Incidentally, the secondary battery includes the use of a secondary battery as a primary battery (use for the purpose of only one discharge, after charge). Also, examples of the shape of the all solid state battery may include a coin shape, a laminate shape, a cylindrical shape, and a square shape.

D. Method for Producing Sulfide Solid Electrolyte

Figure 2:
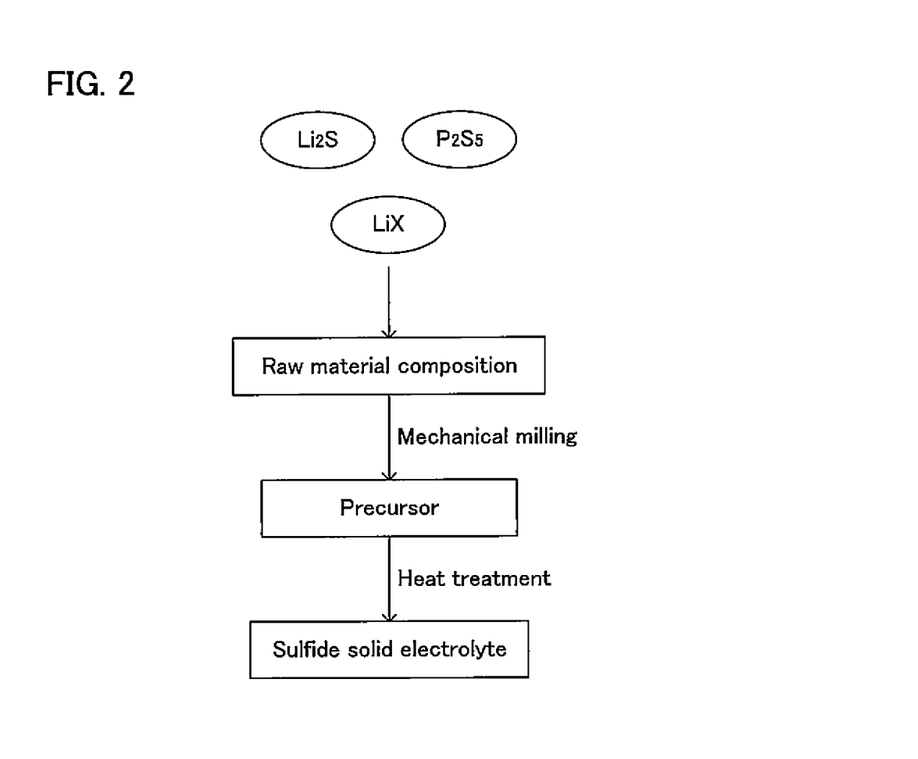
FIG. 2 is a flow chart showing an example of the method for producing the sulfide solid electrolyte in the present disclosure.

FIG. 2 is a flow chart showing an example of the method for producing the sulfide solid electrolyte in the present disclosure. In FIG. 2, a raw material composition including $Li_2S$, $P_2S_5$, and LiX (X is a halogen) is prepared. Next, the raw material composition is mixed by, for example, mechanical milling, and a precursor with $Li_2S$ residual ratio in a specific range is obtained. Next, the obtained precursor is burned. Thereby, the sulfide solid electrolyte described in "A. Sulfide solid electrolyte" above is obtained.

According to the present disclosure, a sulfide solid electrolyte with high ion conductivity may be obtained by using the precursor wherein the $Li_2S$ residual ratio is in the specific range.

1. Mixing Step

The mixing step is a step of obtaining a precursor with $Li_2S$ residual ratio in the specific range, by mixing a raw material composition including at least $Li_2S$.

The raw material composition of the sulfide solid electrolyte includes a Li element, an M element (M is at least one kind of P, Ge, Si and Sn), and a S element. The raw material composition may further include an X element (X is a halogen). Examples of the raw material including an Li element may include a Li sulfide. The raw material composition usually includes $Li_2S$ as the Li sulfide. Examples of the raw material including the M element may include a sulfide including the M element. Examples of the sulfide including the M element may include $P_2S_B$, $GeS_2$, $SiS_2$ and $SnS_2$. Examples of the raw material including the X element may include a lithium halide. Examples of the lithium halide may include LiF, LiCl, LiBr and LiI. Examples of the raw material including a S element may include the above described sulfides and a simple substance of sulfur.

In the mixing step, the raw material composition is mixed and the precursor wherein the $Li_2S$ residual ratio is in the specific range is obtained. That is, the precursor is obtained by moderately amorphizing the raw material composition by mixing. Examples of a method for mixing the raw material composition may include mechanical milling such as ball milling and vibration milling. The mechanical milling may be a dry-type and may be a wet-type; the latter is preferable from the viewpoint of uniform treatment. The kind of the dispersing medium used for the wet-type mechanical milling is not particularly limited.

The various conditions for the mechanical milling are set so as to obtain the desired precursor. When planetary ball milling is used, for example, the raw material mixture and balls for crushing are added, and the treatment is conducted at a specific rotation number for a specific time. The weighing table rotation number of the planetary ball milling is, for example, 150 rpm or more. Meanwhile, the weighing table rotation number of the planetary ball milling is, for example, 500 rpm or less, and may be 250 rpm or less. Also, the treatment time of the planetary ball milling is, for example, 5 minutes or more, and may be 10 minutes or more. Meanwhile, the treatment time of the planetary ball milling is, for example, 15 hours or less, may be 12 hours or less, and may be 10 hours or less.

The precursor obtained by the mixing step may be in the same contents as those described in "B. Precursor of sulfide solid electrolyte" above; thus, the descriptions herein are omitted.

2. Burning Step

The burning step is a step of burning the precursor.

The burning temperature is preferably, for example, higher than 400° C., may be 450° C. or more, and may be 480° C. or more. Meanwhile, the burning temperature is, for example, 800° C. or less. The burning time is, for example, 1 hour or more, and may be 2 hours or more. Meanwhile, the burning time is, for example, 10 hours or less, and may be 5 hours or less. Examples of a burning atmosphere may include an inert gas atmosphere and a vacuum.

3. Sulfide Solid Electrolyte

The sulfide solid electrolyte obtained by the above described steps may be in the same contents as those described in "A. Sulfide solid electrolyte" above; thus, the descriptions herein are omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

A raw material composition (composition: $Li_{5.4}PS_{4.4}Cl_{1.6}$) was obtained by weighing 0.6557 g of $Li_2S$ (from Furuuchi Chemical Corporation), 0.8348 g of $P_2S_5$ (from Aldrich Co. LLC) and 0.5095 g of LiCl (from Kojundo Chemical Lab. Co., Ltd.). The obtained raw material composition was projected into a zirconia pot (45 ml) together with zirconia balls of 5 mm diameter, then, 4 g of dehydrated heptane (from Kanto Chemical Industry Co., Ltd.) was projected, and the pot was sealed. The sealed pot was set to a planetary ball milling machine (P-7 from Fritsch Japan Co., Ltd), mechanically milled for 15 hours at 500 rpm, and a precursor of a sulfide solid electrolyte was obtained.

The obtained precursor was molded into pellets, projected into a carbon coated quartz tube, vacuum sealed, burned at 500° C. for 3 hours (temperature increasing rate of 1° C./min), crushed and mixed in a mortar, and thereby, a sulfide solid electrolyte was obtained.

Example 1

A precursor of a sulfide solid electrolyte was obtained in the same manner as in Comparative Example 1 except that the conditions for the mechanical milling were changed to 200 rpm for 10 minutes. A sulfide solid electrolyte was obtained in the same manner as in Comparative Example 1 except that the obtained precursor was used.

Example 2

A precursor of a sulfide solid electrolyte was obtained in the same manner as in Comparative Example 1 except that the conditions for the mechanical milling were changed to 200 rpm for 30 minutes. A sulfide solid electrolyte was obtained in the same manner as in Comparative Example 1 except that the obtained precursor was used.

Example 3

A precursor of a sulfide solid electrolyte was obtained in the same manner as in Comparative Example 1 except that the conditions for the mechanical milling were changed to 200 rpm for 60 minutes. A sulfide solid electrolyte was obtained in the same manner as in Comparative Example 1 except that the obtained precursor was used.

Example 4

A precursor of a sulfide solid electrolyte was obtained in the same manner as in Comparative Example 1 except that the conditions for the mechanical milling were changed to 500 rpm for 10 hours. A sulfide solid electrolyte was obtained in the same manner as in Comparative Example 1 except that the obtained precursor was used.

Example 5

A precursor of a sulfide solid electrolyte was obtained in the same manner as in Comparative Example 1 except that the conditions for the mechanical milling were changed to 200 rpm for 15 hours. A sulfide solid electrolyte was obtained in the same manner as in Comparative Example 1 except that the obtained precursor was used.

Comparative Example 2

A precursor of a sulfide solid electrolyte was obtained in the same manner as in Comparative Example 1 except that, instead of the mechanical milling, the raw material composition was mixed in a mortar so as to be even. A sulfide solid electrolyte was obtained in the same manner as in Comparative Example 1 except that the obtained precursor was used.

Comparative Example 3

A sulfide solid electrolyte was obtained in the same manner as in Comparative Example 1 except that the burning temperature was changed to 400° C. for 3 hours.

Comparative Example 4

A precursor of a sulfide solid electrolyte was obtained in the same manner as in Comparative Example 1 except that the conditions for the mechanical milling were changed to 370 rpm for 25 hours. A sulfide solid electrolyte was obtained in the same manner as in Comparative Example 1 except that the obtained precursor was used.

[Evaluation]
<XRD Measurement>

Figure 3A:
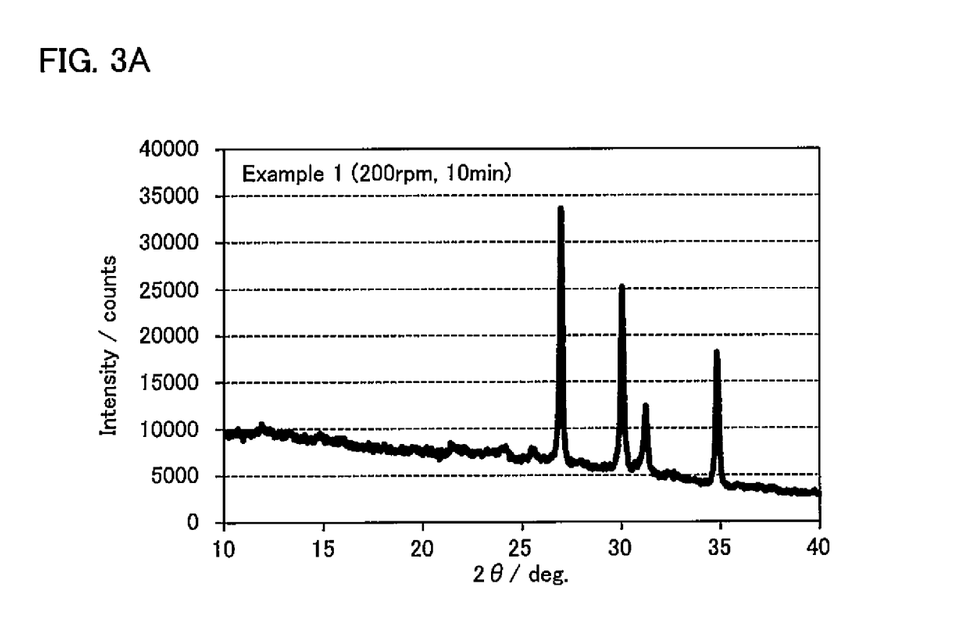
FIGS. 3A and 3B are the results of the XRD measurement to the precursors obtained in Examples 1 and 2.
Figure 3B:
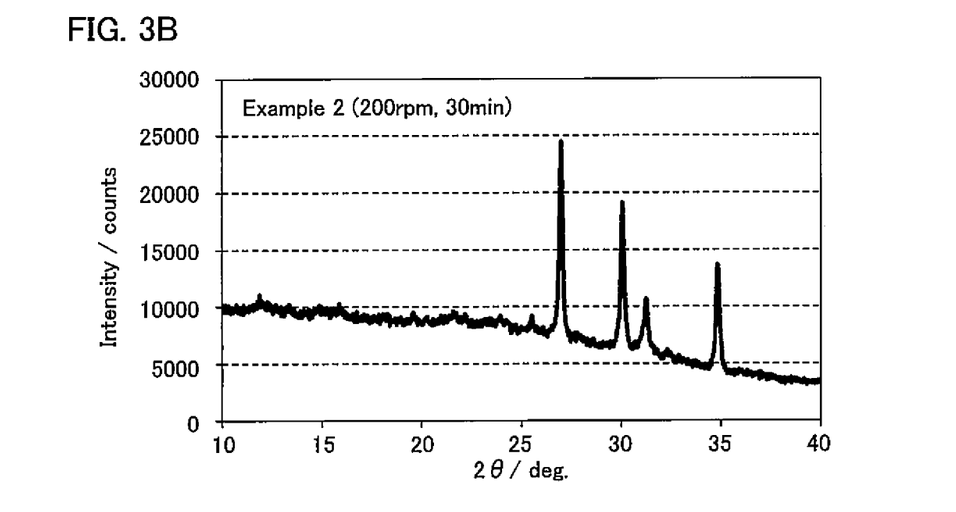
Figure 4A:
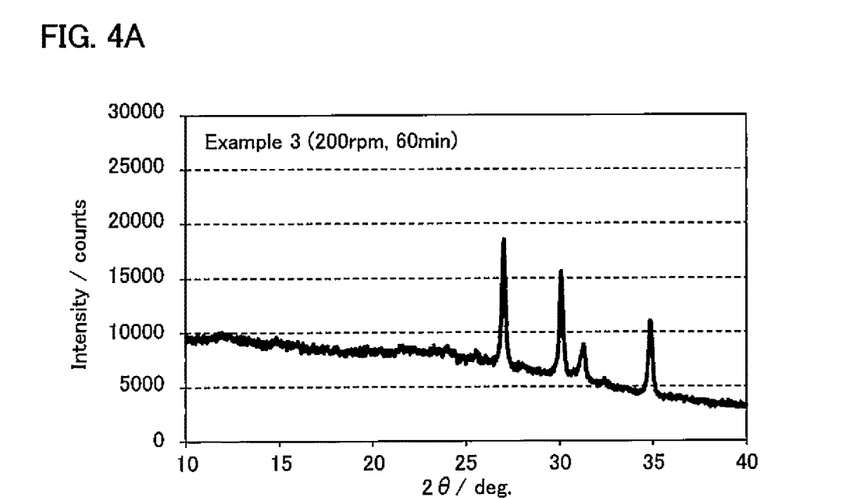
FIGS. 4A to 4C are the results of the XRD measurement to the precursors obtained in Examples 3 to 5.
Figure 4B:
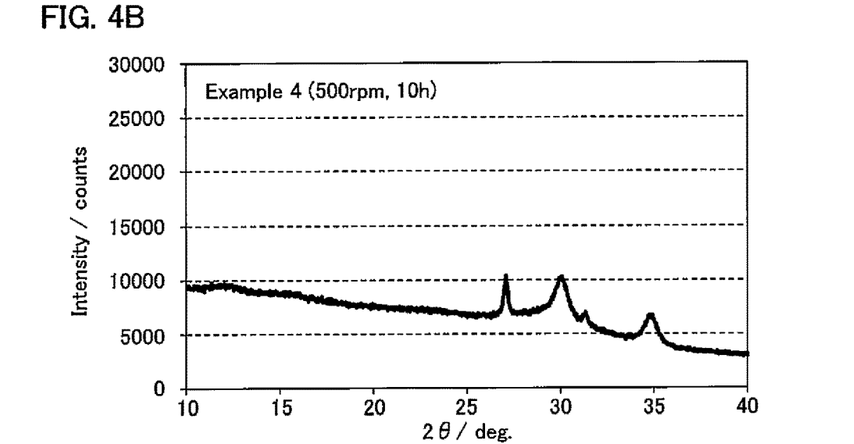
Figure 4C:
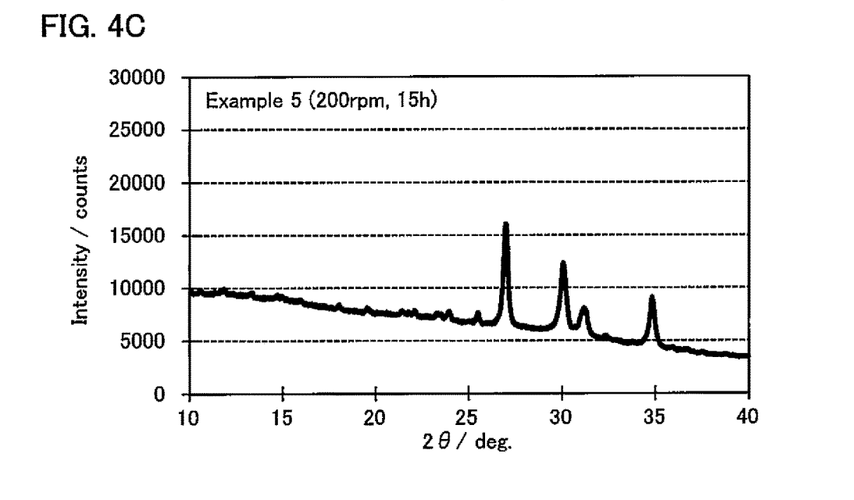

An X-ray diffraction (XRD) measurement using a CuKα ray was carried out for precursors obtained in Examples 1 to 5 and Comparative Examples 1, 2 and 4. The results are shown in FIGS. 3A to 5B. As shown in FIG. 3A, the peaks of $Li_2S$ were confirmed in Example 1 in the vicinity of 2θ=27.0° and in the vicinity of 2θ=31.2°. Also, in Example 1, the peaks of LiCl were confirmed in the vicinity of 2θ=30.0° and in the vicinity of 2θ=34.8°. Also, as shown in FIG. 3B and FIG. 4A to FIG. 4C, the peaks of $Li_2S$ and the peaks of LiCl were confirmed also in Examples 2 to 5, as similar to Example 1.

Figure 5A:
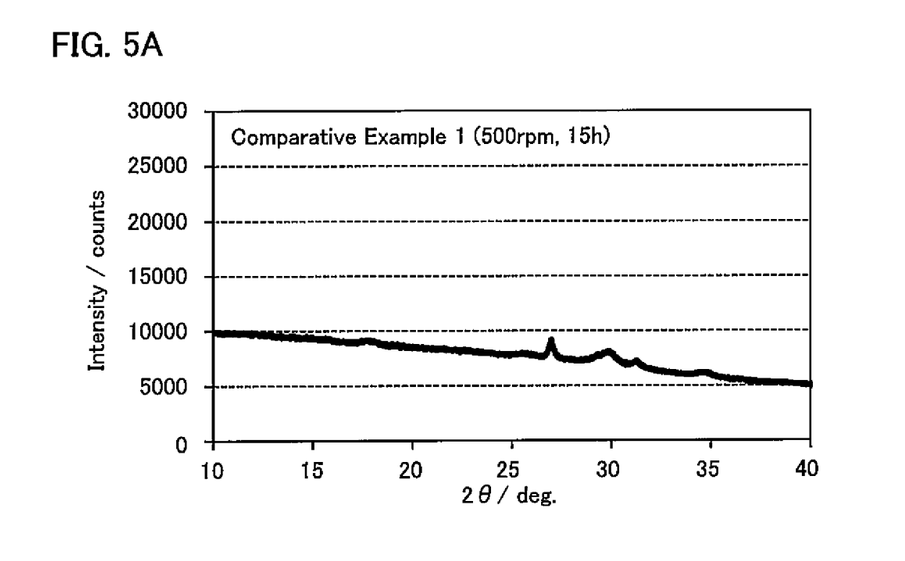
FIGS. 5A and 5B are the results of the XRD measurement to the precursors obtained in Comparative Examples 1 and 2.
Figure 5B:
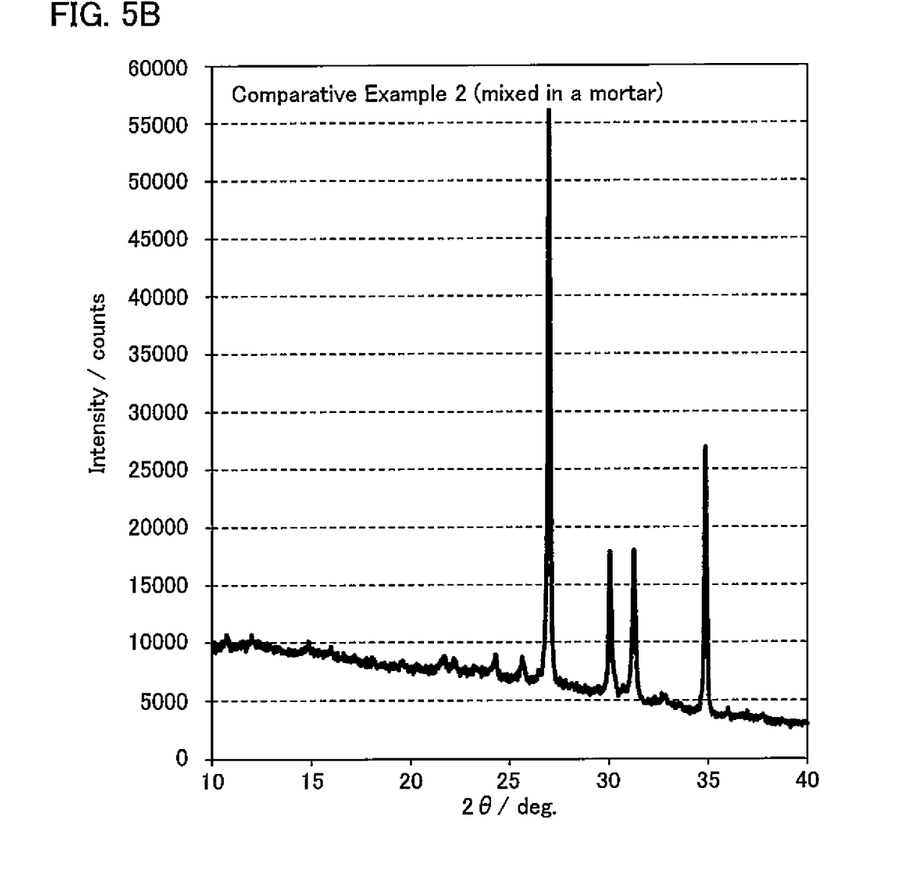
Figure 6:
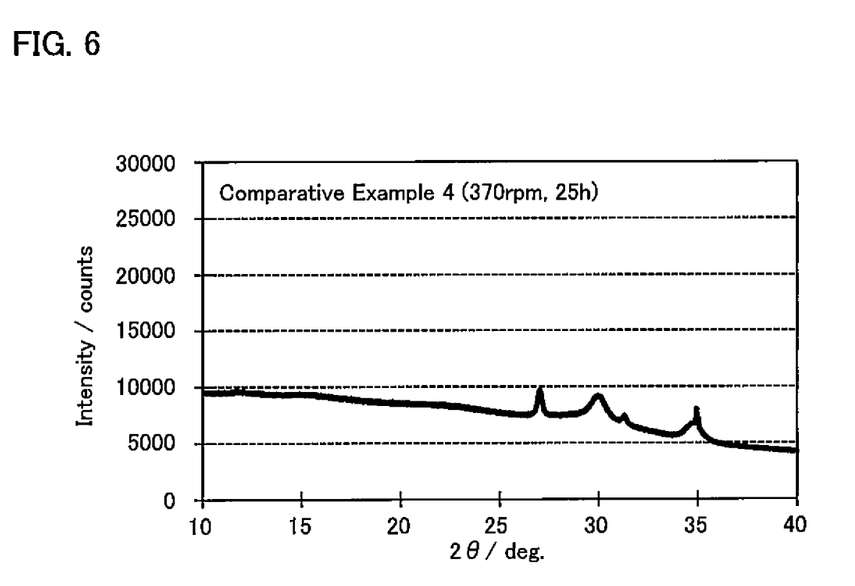
FIG. 6 is the result of the XRD measurement to the precursor obtained in Comparative Example 4.
Figure 7A:
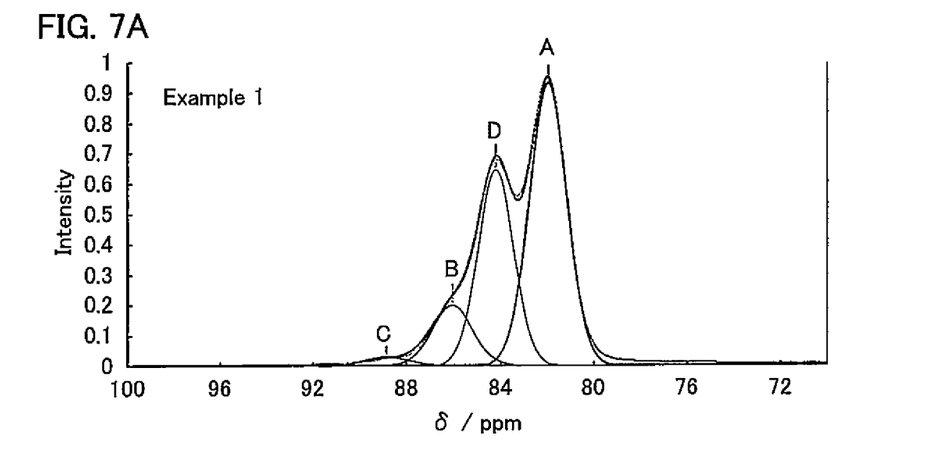
FIGS. 7A and 7B are the results of the NMR measurement to the sulfide solid electrolytes obtained in Examples 1 and 2.
Figure 7B:
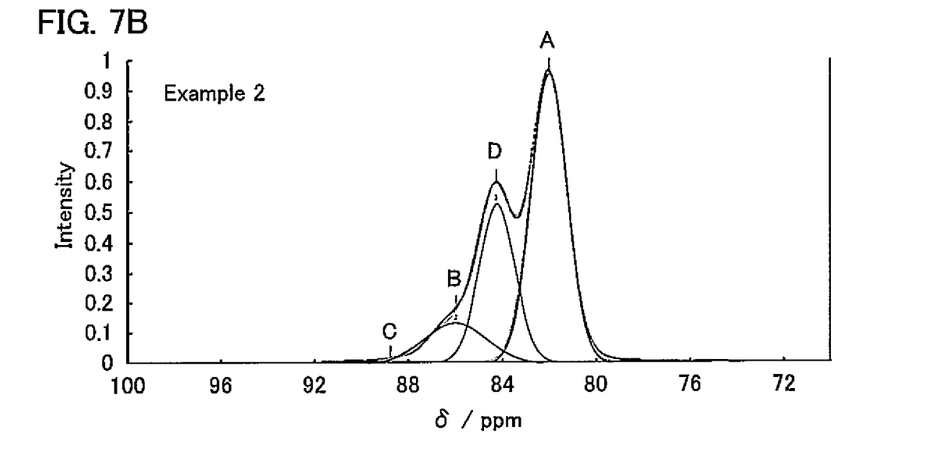
Figure 8A:
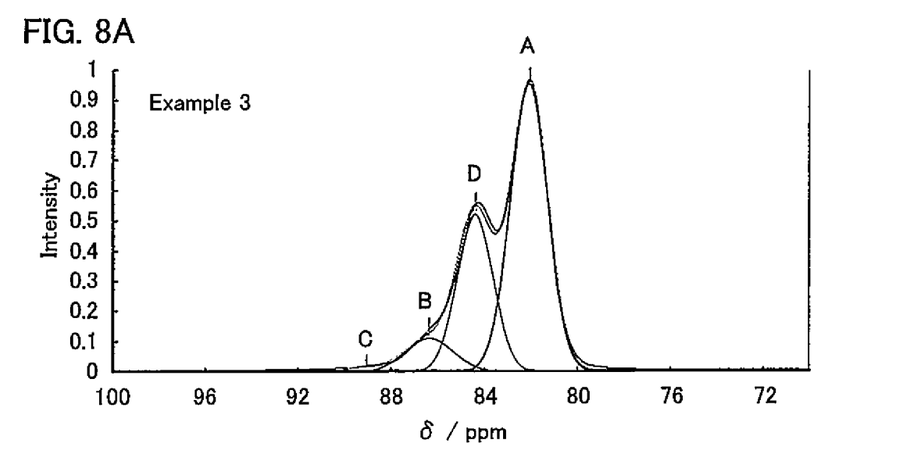
FIGS. 8A and 8B are the results of the NMR measurement to the sulfide solid electrolytes obtained in Examples 3 and 4.
Figure 8B:
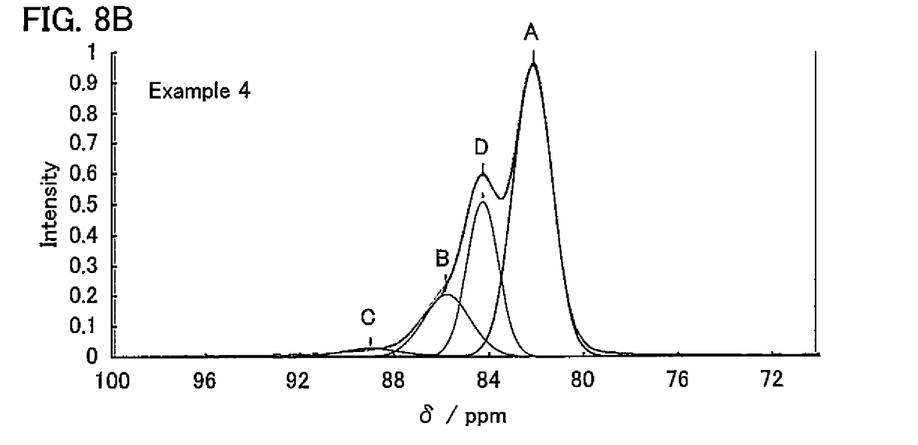
Figure 9A:
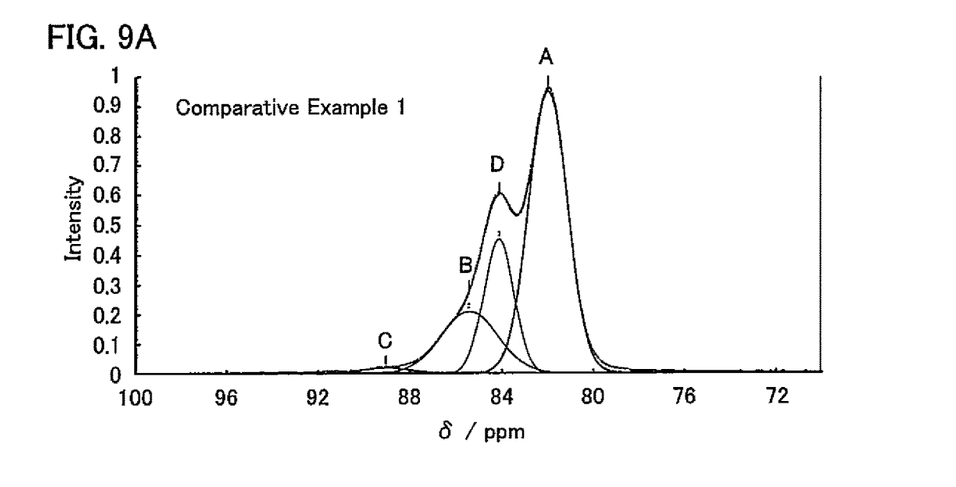
FIGS. 9A to 9C are the results of the NMR measurement to the sulfide solid electrolytes obtained in Comparative Examples 1 to 3.
Figure 9B:
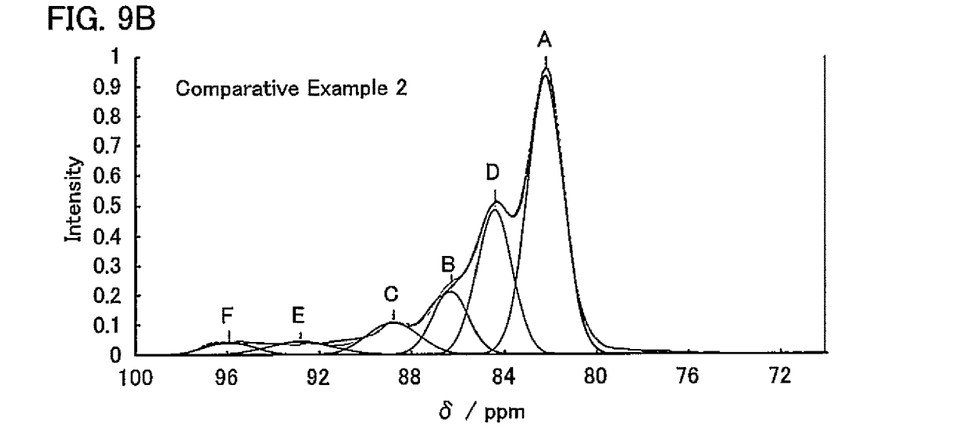
Figure 9C:
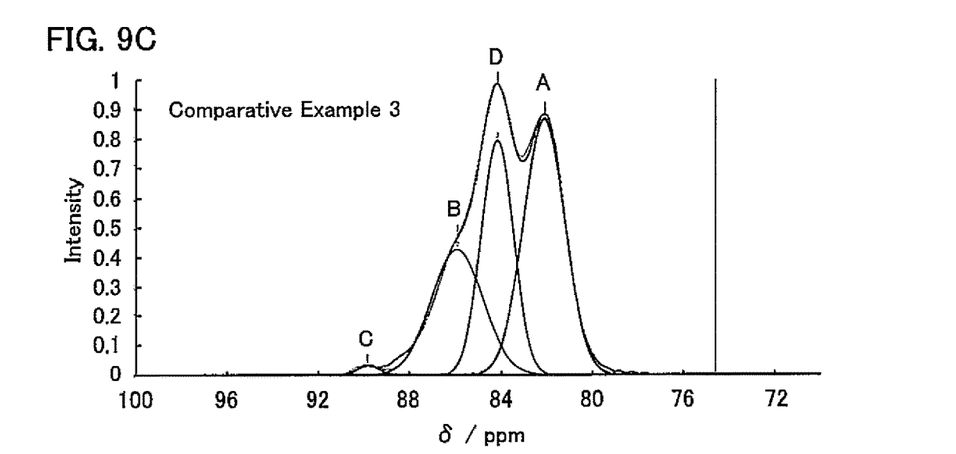

Meanwhile, as shown in FIG. 5A, although the peaks of $Li_2S$ and the peaks of LiCl were confirmed in Comparative Example 1, these peaks were broad compared to the peaks in Examples 2 to 5, and it was confirmed that the amorphization has been progressed. Also, as shown in FIG. 5B, the peaks of $Li_2S$ and the peaks of LiCl were confirmed in Comparative Example 2. Particularly in Comparative Example 2, extremely large peak was confirmed in the vicinity of 2θ=27.0°. Also, as shown in FIG. 6, it was confirmed that the amorphization has been progressed also in Comparative Example 4, as similar to Comparative Example 1. Also, the intensity of the peak of $Li_2S$ (the peak at 2θ=27.0°±0.5°) in Comparative Example 2 was regarded as 100%, the intensity of the peak of $Li_2S$ in Examples 1 to 5 and Comparative Example 1 was determined as $Li_2S$ residual ratio. The results are shown in Table 1. Incidentally, the peak of $P_2S_5$ was confirmed in the vicinity of 2θ=25.6° in Comparative Example 2. Meanwhile, although the peak of $P_2S_5$ was confirmed in the vicinity of 2θ=25.6° also in Example 1, the intensity was decreased.

<NMR Measurement>

$^{31}P$-MAS-NMR measurement was carried out for the sulfide solid electrolytes obtained in Examples 1 to 4 and Comparative Examples 1 to 3. The measuring conditions were as described below.

Equipment: INOVA 300 (from Agilent Technologies, Inc.)
Test tube: 7 mmφ (ZrO$_2$ rotor
Rotation speed: 7000 Hz
Standard: phosphoric acid=0 ppm
Cumulated number: 100 to 500 Gain=auto
Repetition time: 10 seconds The results are shown in FIG. 7A to FIG. 9C. Incidentally, although the sulfide solid electrolyte is a material whose relaxation time is short, the repetition time is preferably, for example, 8 seconds or more. When the repetition time is too short, sufficient relaxation may not be obtained, and the waveform tends to be disturbed. Meanwhile, the repetition time is, for example, 15 seconds or less.

As shown in FIG. 7A to FIG. 9C, the following peaks A to D were confirmed in Examples 1 to 4 and Comparative Examples 1 to 3.

Peak A: 82.1±0.5 ppm
Peak B: 86.1±0.5 ppm
Peak C: 89.1±0.5 ppm
Peak D: 84.1±0.5 ppm Peak A is a peak deriving from the argyrodite type crystal phase. Peak B is a peak deriving from an amorphous phase related to the argyrodite type crystal phase. Meanwhile, peak C is presumed to be a peak deriving from the crystal phase other than the argyrodite type crystal phase (different phase), and peak D is presumed to be a peak deriving from P—S bonding in the vicinity of the site where Cl is not dissolved in the argyrodite type crystal phase.

In Examples 1 to 4 and Comparative Examples 1 and 3, only peaks A to D were confirmed and other peak was not confirmed in a range of 76 ppm or more and 100 ppm or less. In contrast to this, in addition to peaks A to D, peaks E and F were confirmed in Comparative Example 2, in a range of 76 ppm or more and 100 ppm or less. Also, as shown in FIG. 7A to FIG. 9C, the area ratio of peak A to D was determined by carrying out a waveform separation for the obtained NMR chart, by fitting in a state where each peak top is fixed so as to be in the designated range. The results are shown in Table 1.

<Ion Conductivity Measurement>

The ion conductivity (25° C.) of the sulfide solid electrolytes obtained in Examples 1 to 5 and Comparative Examples 1 to 4 was measured. 100 mg of the obtained sulfide solid electrolyte powder was pressed under pressure of 6 ton/cm$^2$ with a pelleting press so as to produce a pellet. The resistance of the pellet was determined by an AC impedance method, and the ion conductivity was determined from the thickness of the pellet. The results are shown in Table 1.

solid electrolyte were mutually related. Comparing Examples 1 to 4, for example, a tendency was suggested that, the higher the area ratio of peak A $S_A$ was, the higher the ion conductivity was. Also, comparing Example 3 and Comparative Example 1, a tendency was suggested that, the lower the area ratio of peak B $S_B$ was, the higher the ion conductivity was, although the area ratios of peak A $S_A$ and peak C $S_C$ were almost the same. Also, comparing Example 2 and Comparative Example 2, a tendency was suggested that, the lower the area ratio of peak C $S_C$ was, the higher the ion conductivity was, although the area ratios of peak A $S_A$ and peak B $S_B$ were almost the same. As described above, the lower $S_B/S_A$ or $(S_B+S_C)/S_A$ was, the higher the ion conductivity was.

Also, comparing Comparative Example 1 (burning temperature 500° C.) and Comparative Example 3 (burning temperature 400° C.), the area ratio $S_A$ was higher and the area ratio $S_B$ was lower in Comparative Example 1 than Comparative Example 3. As described above, it was suggested that, in order to make the area ratio $S_A$ higher, relatively high burning temperature was preferable. Also, although the mechanical milling conditions in Comparative Example 4 (370 rpm, 25 hours) were the same as the mechanical milling conditions in Example in Patent Literature 1, the Li$_2$S residual ratio was low so that it was suggested that $S_B/S_A$ was high since the amorphization was progressed.

Reference Example 1

A raw material composition (composition: Li$_{5.8}$PS$_{4.8}$Cl$_{1.2}$) was obtained by weighing 0.7896 g of Li$_2$S (from Furuuchi Chemical Corporation), 0.8304 g of P$_2$S$_5$ (from Aldrich Co. LLC) and 0.3801 g of LiCl (from Kojundo Chemical Lab. Co., Ltd.). A sulfide solid electro-

TABLE 1

| | Li$_2$S | NMR | | | | | | Ion |
|---|---|---|---|---|---|---|---|---|
| | residual ratio (%) | Area ratio of peak A $S_A$(%) | Area ratio of peak B $S_B$ (%) | Area ratio of peak C $S_C$ (%) | Area ratio of peak D $S_D$ (%) | $S_B/S_A$ | $(S_B + S_C)/S_A$ | conductivity (mS/cm) |
| Example 1 | 54.7 | 51.8 | 11.9 | 2.0 | 34.3 | 0.23 | 0.27 | 7.1 |
| Example 2 | 34.2 | 55.6 | 12.8 | 0.7 | 30.9 | 0.23 | 0.24 | 9.6 |
| Example 3 | 23.3 | 60.1 | 9.6 | 1.1 | 29.2 | 0.16 | 0.18 | 9.9 |
| Example 4 | 7.7 | 56.5 | 13.2 | 2.1 | 28.1 | 0.23 | 0.27 | 7.2 |
| Example 5 | 18.9 | — | — | — | — | — | — | 8.9 |
| Comp. Ex. 1 | 3.3 | 58.0 | 18.8 | 1.4 | 21.7 | 0.32 | 0.35 | 5.5 |
| Comp. Ex. 2 | 100 | 54.0 | 13.4 | 9.5 | 23.4 | 0.25 | 0.42 | 4.9 |
| Comp. Ex. 3 | 3.3 | 42.7 | 26.1 | 1.1 | 30.1 | 0.61 | 0.64 | 3.9 |
| Comp. Ex. 4 | 4.3 | — | — | — | — | — | — | 6.3 |

As shown in Table 1, the ion conductivity was higher in Examples 1 to 5, compared to Comparative Examples 1 to 4. The ion conductivity in Examples 2 and 3 was 9 mS/cm or more, and the ion conductivity was particularly high. Also, in Examples 1 to 5, the Li$_2$S residual ratio in the precursor was 7.7% or more and 54.7% or less, higher than Comparative Example 1. As described above, it was confirmed that a sulfide solid electrolyte with high ion conductivity may be obtained by making the Li$_2$S residual ratio high to an extent.

Also, from the MNR results, it was suggested that the area ratio of peaks A to C and the ion conductivity of the sulfide lyte was obtained in the same manner as in Comparative Example 3 except that the obtained raw material composition was used.

Reference Example 2

A raw material composition (composition: Li$_{5.6}$PS$_{4.6}$Cl$_{1.4}$) was obtained by weighing 0.7228 g of Li$_2$S (from Furuuchi Chemical Corporation), 0.8326 g of P$_2$S$_5$ (from Aldrich Co. LLC) and 0.4446 g of LiCl (from Kojundo Chemical Lab. Co., Ltd.). A sulfide solid electrolyte was obtained in the same manner as in Comparative Example 3 except that the obtained raw material composition was used.

Reference Example 3

A raw material composition (composition: $Li_{5.2}PS_{4.2}Cl_{1.8}$) was obtained by weighing 0.5883 g of $Li_2S$ (from Furuuchi Chemical Corporation), 0.8370 g of $P_2S_5$ (from Aldrich Co. LLC) and 0.5747 g of LiCl (from Kojundo Chemical Lab. Co., Ltd.). A sulfide solid electrolyte was obtained in the same manner as in Comparative Example 3 except that the obtained raw material composition was used.

Reference Example 4

A raw material composition (composition: $Li_{5.0}PS_{4.0}Cl_{2.0}$) was obtained by weighing 0.5205 g of $Li_2S$ (from Furuuchi Chemical Corporation), 0.8393 g of $P_2S_5$ (from Aldrich Co. LLC) and 0.6403 g of LiCl (from Kojundo Chemical Lab. Co., Ltd.). A sulfide solid electrolyte was obtained in the same manner as in Comparative Example 3 except that the obtained raw material composition was used.

[Evaluation]

$^{31}$P-MAS-NMR measurement was carried out for the sulfide solid electrolytes obtained in Reference Examples 1 to 4. The measuring conditions were the same as described above. The results are shown in Table 2.

TABLE 2

|  | y in $Li_{7-y}PS_{6-y}Cl_y$ | NMR | | | | | |
|---|---|---|---|---|---|---|---|
|  |  | Area ratio of peak A $S_A$(%) | Area ratio of peak B $S_B$ (%) | Area ratio of peak C $S_C$ (%) | Area ratio of peak D $S_D$ (%) | $S_B/S_A$ | $(S_B + S_C)/S_A$ |
| Ref. Ex. 1 | 1.2 | 20.5 | 55.1 | 0.0 | 24.4 | 2.69 | 1.19 |
| Ref. Ex. 2 | 1.4 | 27.5 | 46.0 | 0.0 | 26.5 | 1.67 | 0.96 |
| Ref. Ex. 3 | 1.8 | 21.6 | 52.7 | 6.6 | 17.2 | 2.44 | 1.10 |
| Ref. Ex. 4 | 2.0 | 18.3 | 14.6 | 33.6 | 15.1 | 0.80 | 2.66 |

As shown in Table 2, it was confirmed that as y got larger, the area ratio of peak C became higher in Reference Examples 1 to 4. Therefore, it was suggested that peak C was a different phase related to Cl not dissolved in the argyrodite type crystal phase. Therefore, in the viewpoint of preventing the deposition of a different phase, it was suggested that y was preferably 1.8 or less. Also, the area ratio of peak C in Reference Examples 1 and 2 was 0%. Therefore, it was suggested that peak C did not appear when the value of y was low.

REFERENCE SIGNS LIST 1 cathode layer
2 anode layer
3 solid electrolyte layer
4 cathode current collector
5 anode current collector
6 battery case
10 all solid state battery

What is claimed is:

1. A method for producing a sulfide solid electrolyte where the sulfide solid electrolyte comprises:
   a Li element,
   an M element selected from the group consisting of P, Ge, Si and Sn,
   and
   a S element, and
   the sulfide solid electrolyte has an argyrodite type crystal phase,
   in 31P-MAS-NMR, the sulfide solid electrolyte has
      peak A at 82.1 ppm±0.5 ppm and
      peak B at 86.1 ppm±0.5 ppm, and
      when an area ratio of the peak A is regarded as $S_A$, and an area ratio of the peak B is regarded as $S_B$, a proportion of the $S_B$ to the $S_A$, $S_B/S_A$, is 0.23 or less and greater than 0; and
   the method characterized by comprising steps of:
   a mixing step of obtaining a precursor with a $Li_2S$ residual ratio of 7.7% or more and 54.7% or less, by mixing a raw material composition including at least $Li_2S$ and a sulfide including the M element, and
   a burning step of burning the precursor of obtaining the sulfide solid electrolyte.

2. The method according to claim 1, wherein
   the sulfide solid electrolyte further has peak C at 89.1 ppm±0.5 ppm, and
   when an area ratio of the peak C is regarded as $S_C$, a proportion of a total of the $S_B$ and the $S_C$ to the $S_A$, $(S_A+S_C)/S_A$, is 0.27 or less and greater than 0.

3. The method according to claim 2, wherein $(S_B+S_A)/S_A$ is 0.18 or more and 0.27 or less.

4. The method according to claim 2, wherein y satisfies 1.2≤y≤2.

5. The method according to claim 1, wherein
   the sulfide solid electrolyte further has peak D at 84.1 ppm±0.5 ppm.

6. The method according to claim 5, wherein
   when the area ratio of the peak D is regarded as $S_D$, the $S_D$ is 10% or more and 35% or less.

7. The method according to claim 1, wherein the M includes at least P.

8. The method according to claim 1, wherein
   the sulfide solid electrolyte further comprises an X element that is a halogen.

9. The method according to claim 1, wherein the X element includes at least Cl.

10. The method according to claim 1, wherein the sulfide solid electrolyte has a composition represented by $Li_{7-y}PS_{6-y}X_y$, where y satisfies 0<y≤2.

11. The method according to claim 1, wherein $S_B/S_A$ is 0.16 or more and 0.23 or less.

* * * * *